April 2, 1946.  C. R. STAUB  2,397,515
GEAR SHAVING MACHINE
Filed July 26, 1943  7 Sheets-Sheet 4

INVENTOR
Charles R. Staub.
BY
Harness, Dickey & Pierce
ATTORNEYS.

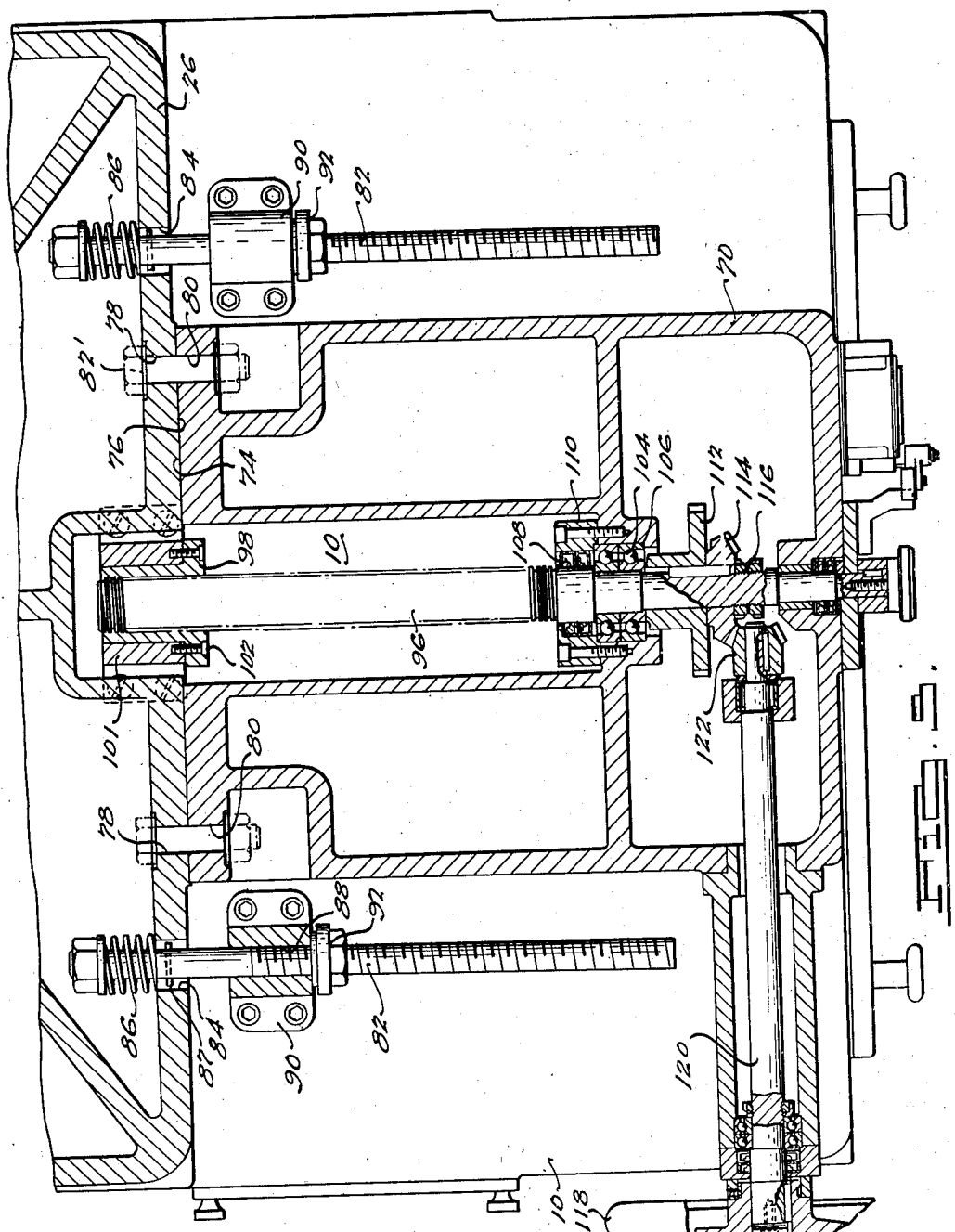

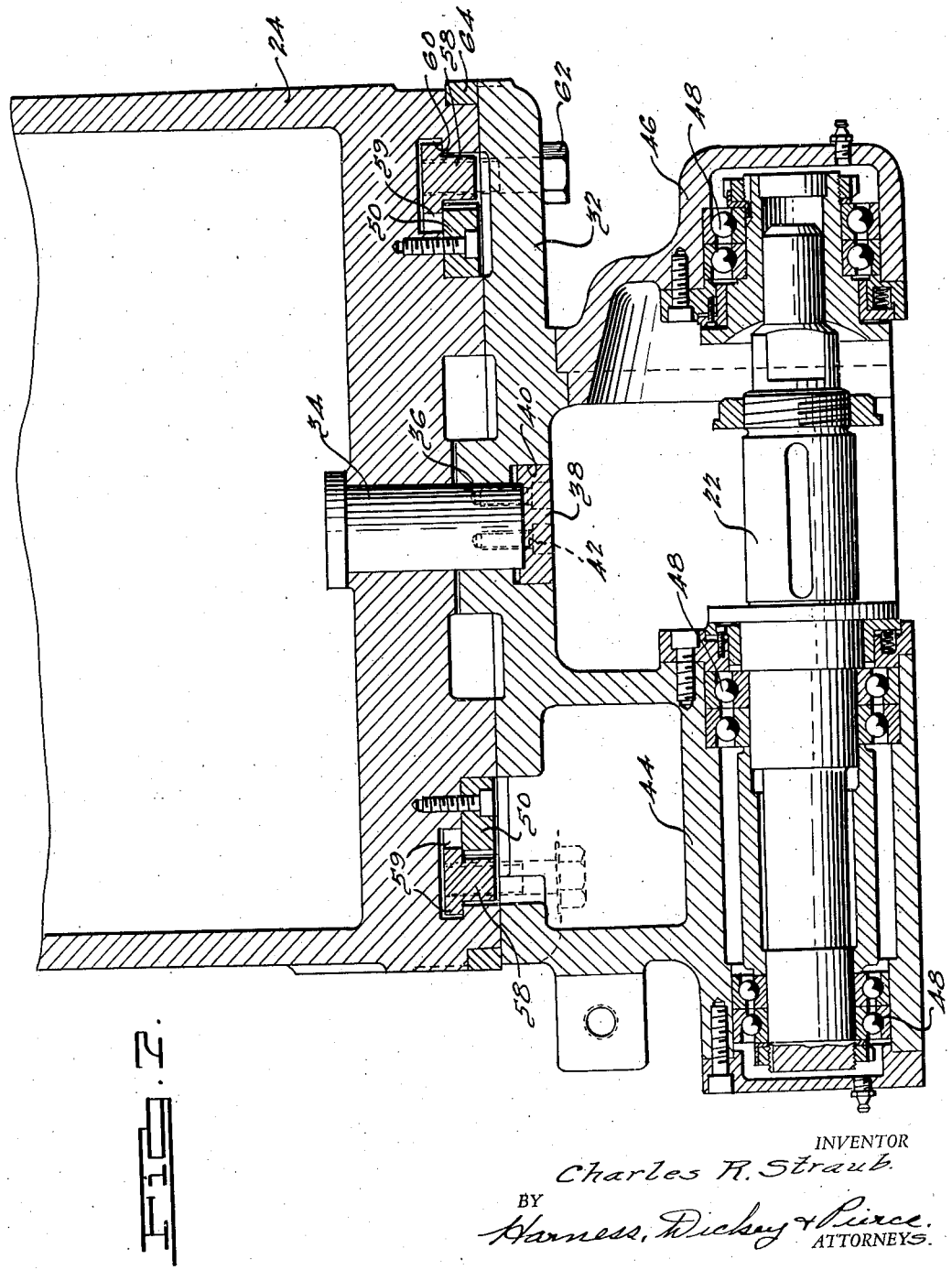

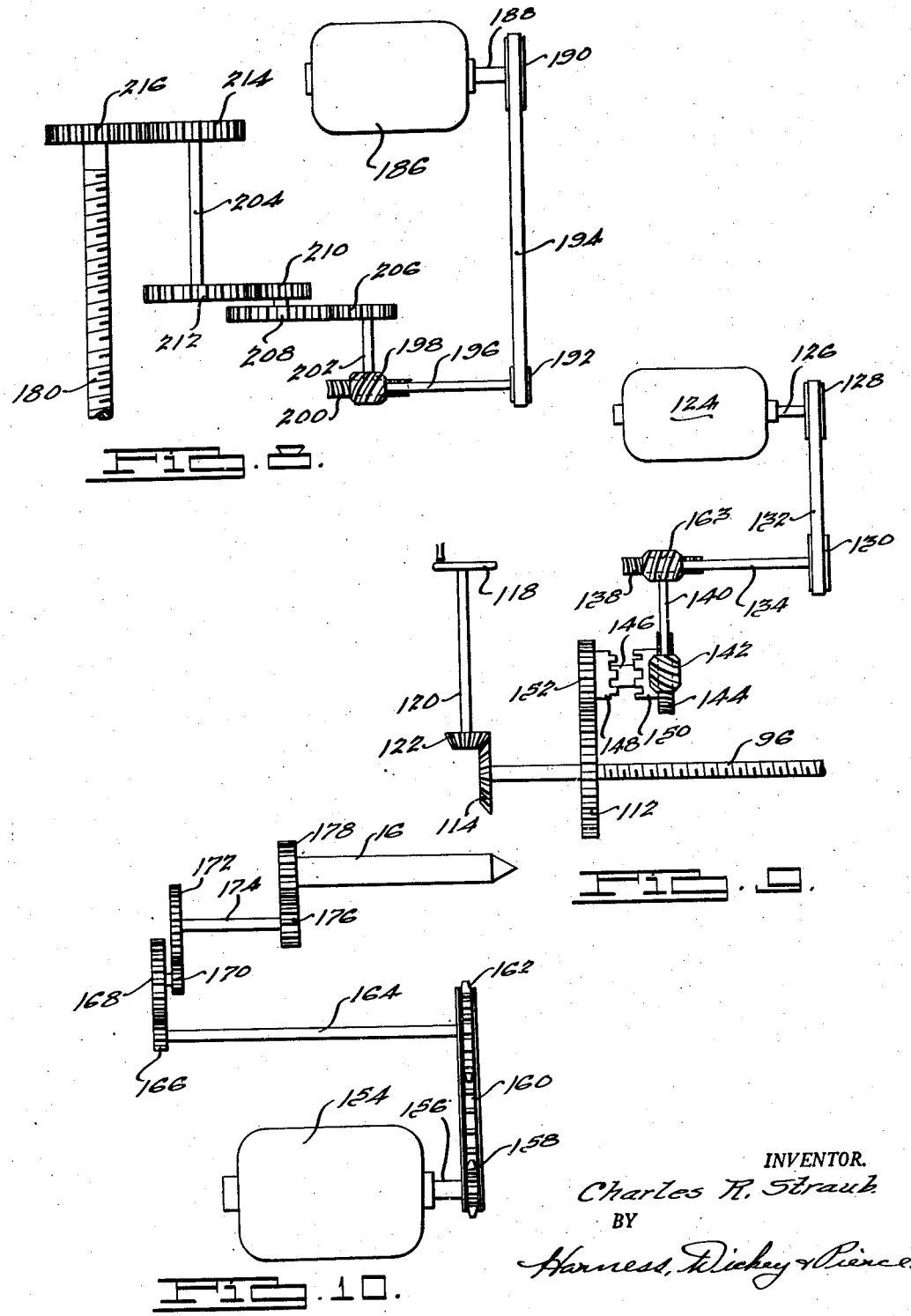

Patented Apr. 2, 1946

2,397,515

UNITED STATES PATENT OFFICE 2,397,515

GEAR SHAVING MACHINE

Charles R. Staub, Detroit, Mich., assignor to Michigan Tool Company, Detroit, Mich.

Application July 26, 1943, Serial No. 496,150

5 Claims. (Cl. 90—1.6)

The present invention relates to gear forming machines and particularly relates to a gear shaving machine adapted for crowning gears.

The present invention utilizes principles of gear shaving disclosed in Dalzen Patents No. 2,123,717 and No. 2,305,144, and particularly utilizes such principles on a machine employing a circular cutting tool.

One of the primary objects of the present invention is to provide improvements in gear shaving machines of the type adapted for crowning gears in which the crowning is accomplished without the disadvantage of biasing the bearing against the work.

A further object of the invention is to provide a machine for crowning gears in which the gears are shaved with the work arbor and cutting tool arbor at a predetermined crossed-axis relationship and at a predetermined center distance and in which the crowning is accomplished by varying the center distance as the cutter approaches each end of the gear tooth, by relative cross-feeding of the arbors in parallel planes, where such planes are normal to the direction of infeed, and without changing the crossed-axis relationship. In other words, the crowning is accomplished without changing the angle between the arbors.

Another object of the invention is to provide a machine of the type mentioned which is adapted for use in shaving gears following the principles of the above mentioned Dalzen patents or which is adapted for use to crown gears.

Other objects of the invention will become apparent from the following specification, the drawings relating thereto and from the claims hereinafter set forth.

In the drawings in which like numerals are used to designate like parts in the several views throughout:

Fig. 5 is an enlarged cross-sectional view taken substantially along the line 5—5 of Fig. 3;

Fig. 6 is a fragmentary top plan view of a portion of the crowning structure taken along the line 6—6 of Fig. 1;

Fig. 7 is an enlarged cross-sectional view illustrating the manner in which the cutter arbor is rotatably mounted for varying the crossed axis relationship between the cutting arbor and the work arbor;

Fig. 8 is a diagrammatic view of the drive for obtaining the cross-feed;

Fig. 9 is a diagrammatic view of the drive for the in-feed;

Fig. 10 is a diagrammatic view of the main drive for the head stock spindle;

In general, the machine of the present invention is constructed to shave gears following the principles of the above mentioned Dalzen patents. The work gear is mounted on a driven arbor having a fixed axis. A circular cutting tool is mounted on another arbor at proper center distance from the axis of the gear to be shaved and is disposed at the proper crossed-axis relationship with respect thereto, in accordance with the teachings of the Dalzen patents. The work and shaving cutter are meshed with each other, and as the work is driven the cutter rotates therewith. During the shaving the cutter arbor is moved across the width of the teeth of the work gear on its crossed axis in a direction parallel to the axis of rotation of the work gear.

In order to obtain the crowning of the gear teeth, the cutter arbor is caused to move toward the axis of rotation of the work gear as it approaches the ends of the teeth in a direction normal thereto. In other words, the center distance between the arbors is varied between the limits of movement of the cutter arbor without changing the crossed-axis relationship between the arbors by relative cross-feeding the arbors in parallel planes, where such planes are normal to the direction of in-feed.

For a more complete understanding of the invention reference may be had to the accompanying drawings in which an illustrative embodiment is shown.

Figure 3:
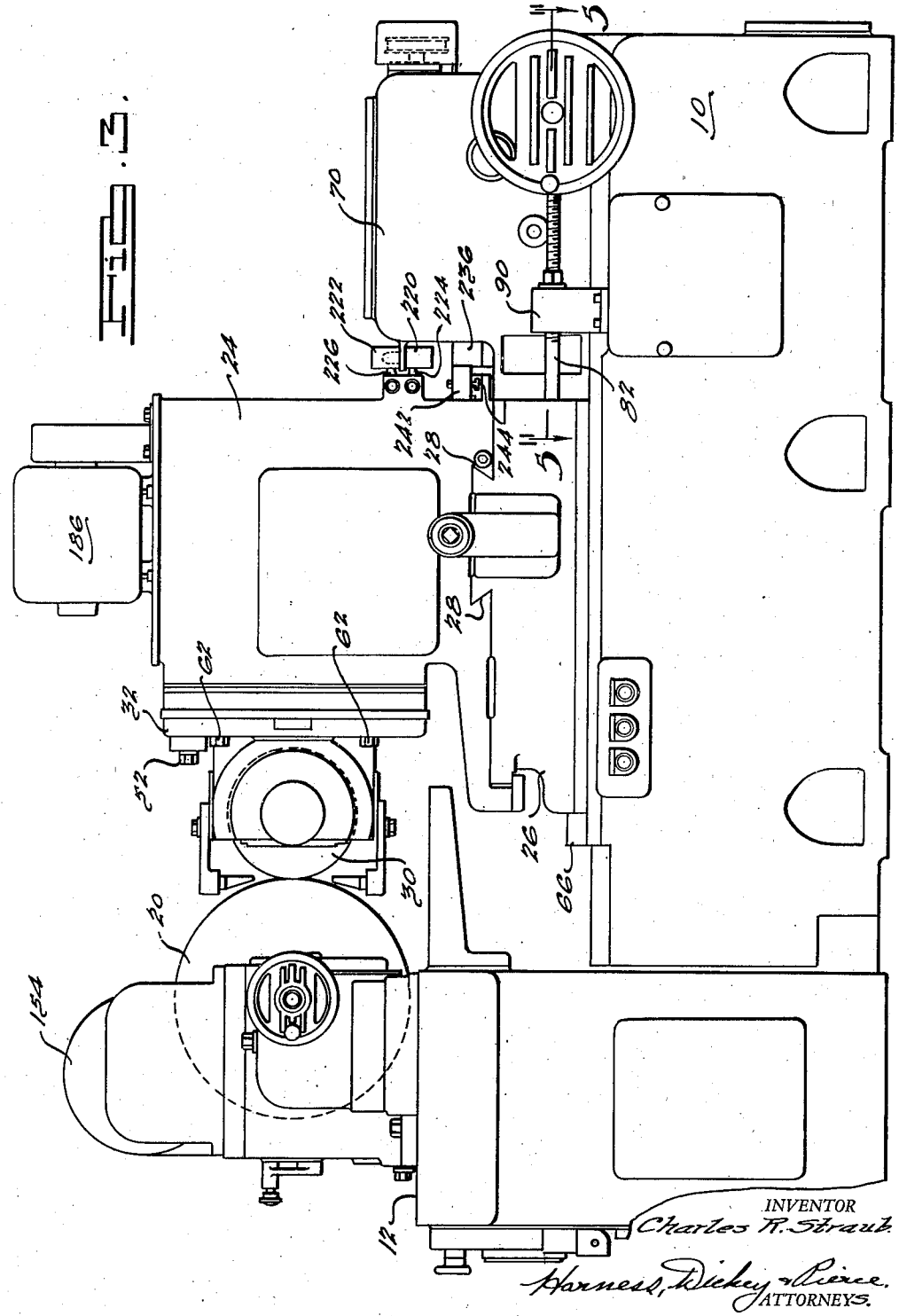
Fig. 3 is a side elevational view of the machine shown in Fig. 1.

The machine comprises a base 10 having a work table 12 provided with a horizontal surface. The horizontal surface is formed with parallel ways 14 upon which are slidably mounted a head stock spindle assembly 16 and a tail stock spindle assembly 18. The head and tail stock spindles 16 and 18 are mounted for movement toward and away from each other and may be fixed in position in the usual way. A work arbor is adapted to be received between the spindles and be fixed to the head stock spindle to be driven thereby. The work, which is diagrammatically illustrated at 20 in Fig. 3, is a gear to be shaved and is fixed to the work arbor and adapted to be driven thereby. As mentioned, the head stock spindle is driven and the drive means, which is diagrammatically shown in Fig. 10, will be described hereinafter. For the present, it will be sufficient to understand that the head stock spindle, the work arbor and the work 20 are driven, with the spindle so located that the work gear 20 is disposed at the center of the machine.

A cutter or tool arbor 22 is mounted on a carriage 24, adjacent table 12, which in turn is mounted on another carriage 26. The top of carriage 26 is formed with parallel ways 28 which are parallel to the axis of the work arbor and the carriage 24 is slidably mounted thereon for transverse movement with respect thereto, or for cross movement parallel to the axis of the work arbor.

The cutter arbor 22 is adapted to have keyed thereto a circular shaving tool 30 which is diagrammatically illustrated in Fig. 3. The shaving tool 30 is of the circular type described in the above mentioned Dalzen Patent No. 2,305,144.

The cutter arbor 22 is adapted to be angularly disposed with respect to the axis of the work arbor to obtain the crossed-axis relationship above mentioned. This is in accordance with the teachings of the above mentioned Dalzen patents. In the drawings, the cutter arbor 22 is shown as being parallel to and in the same plane as the axis of the work arbor but this is merely for the purpose of clear illustration. It will be understood that in operation this relationship does not exist but the axes are crossed, as mentioned above.

Figure 1:
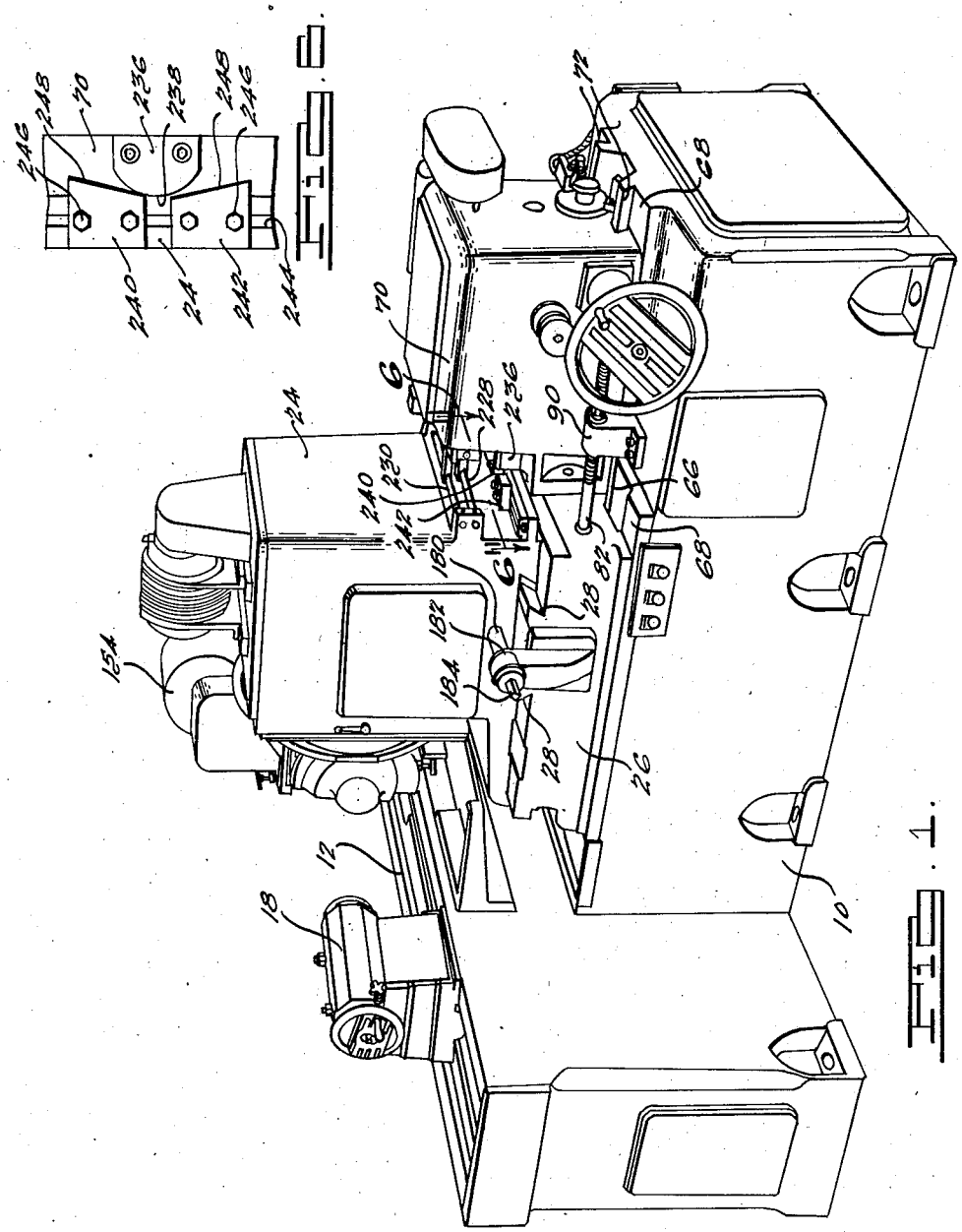
Figure 1 is a perspective view of a shaving and crowning machine embodying features of the present invention.
Figure 2:
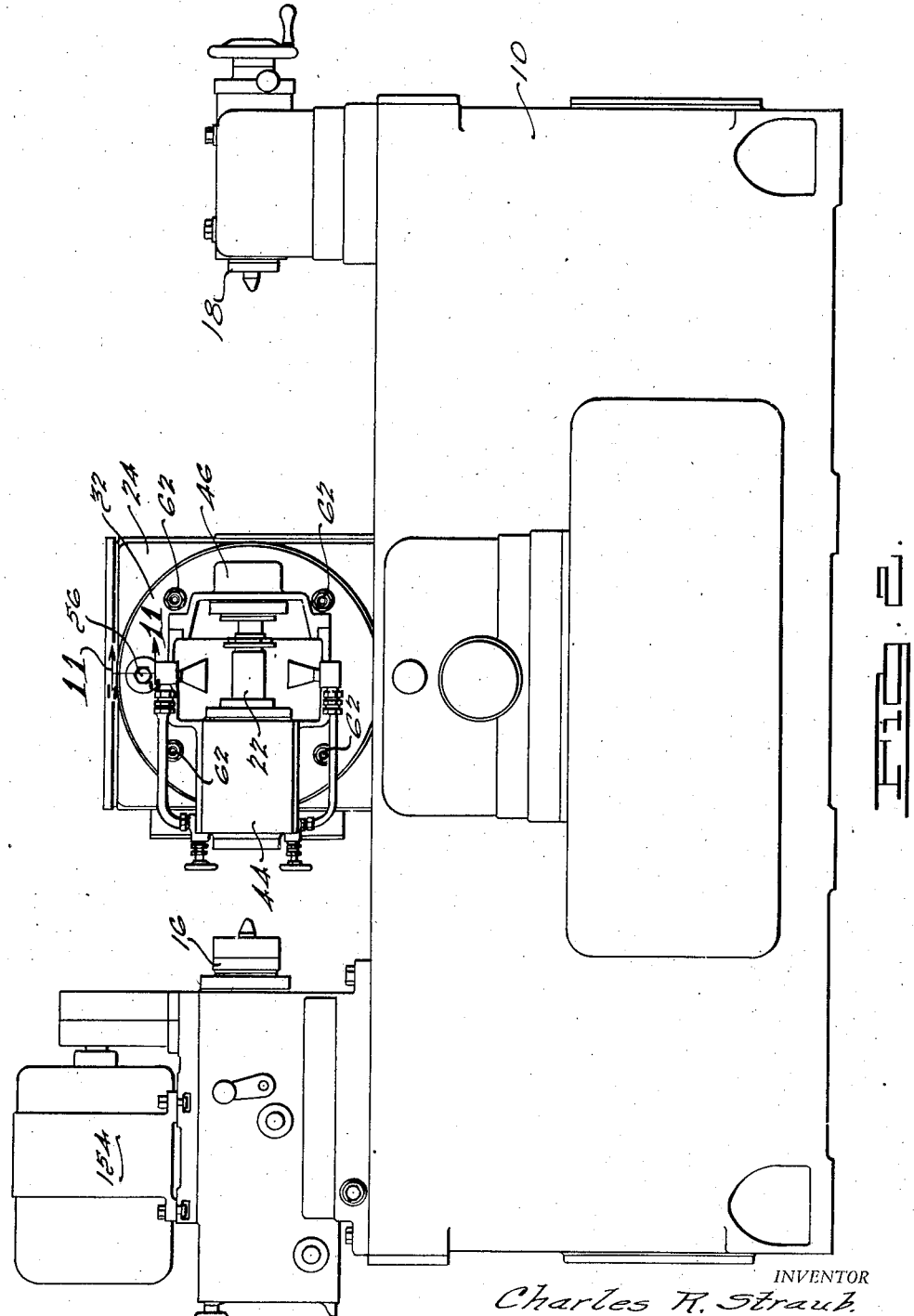
Fig. 2 is a front elevational view of the machine shown in Fig. 1.
Figure 11:
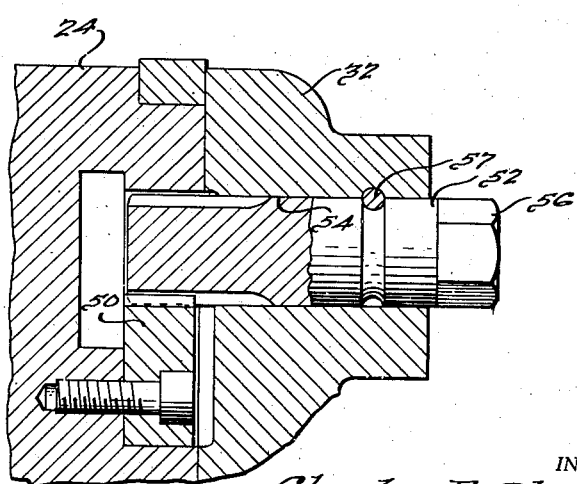
Fig. 11 is a fragmentary cross-sectional view taken substantially along the line 11—11 of Fig. 2.

The manner in which the tool arbor 22 is mounted to the carriage 24 for obtaining the crossed-axis relationship is best shown in Figs. 2, 7 and 11. A circular mounting plate 32 is rotatably mounted on the front vertical face of carriage 24. A mounting pin 34 is received through a central aperture in the front face of the carriage 24 and projects therebeyond into a central aperture 36 of member 32. The head of the pin 34 overlies the edge of the aperture through the front wall of the carriage 24 and an end-plate 38 is received in an enlarged recess 40 provided in member 32 and is secured to the end of pin 34 by means of screws 42. The member 32 may thus be revolved on pin 34 and with respect to carriage 24. Means for rotating the member 32 and for holding it in its adjusted position will be described hereinafter.

Member 32 is formed with aligned bosses 44 and 46 on the front face thereof which are provided with aligned openings therethrough. Such openings receive the ends of the tool arbor 22 therein and are provided with ball bearing assemblies 48 for rotatably mounting the tool arbor 22. The axis of the openings are such that the axis of the tool arbor 22 is in a vertical plane parallel to a vertical plane passing through the work arbor.

In order to dispose the tool arbor 22 in its proper crossed-axis relationship with respect to the work arbor, a ring gear 50 is fixed to the front face of carriage 24. A pinion 52 (Fig. 11) is rotatably mounted within an opening 54 provided within member 32 and disposed adjacent the periphery thereof so that the pinion 52 meshes with the ring gear 50. The pinion 52 is rotatably mounted in the aperture 54 but is held against axial displacement by means of a snap spring 57 which is received within complementary recesses provided in pinion 52 and the opening 54. The outer end of the pinion is formed with a nut head 56 so that the pinion may be turned by a suitable tool.

It will be appreciated that as the pinion is turned it is fixed to ride around the fixed ring gear 50 carrying with it the mounting member 32. As the mounting member 32 is turned about pivot pin 34 the crossed-axis relationship of the tool arbor 22 is varied with respect to the work arbor. When the tool arbor is in proper crossed-axis relationship the mounting member 32 is clamped to the carriage 24 by means of a plurality of clamping nuts 58. The clamping nuts 58 are formed with arcuate heads 59 which are adapted to overlie substantial portions of an annular flange 60 on member 24 and also the ring gear 50. Bolts 62 are passed through apertures in member 32 and are threaded into the nuts 58, so that as the bolts 62 are tightened the nuts 58 are pulled against the flange 60 and the ring gear to clamp the member 32 to the front face of the carriage 24. A bearing ring 64 may be fixed to the front face of carriage 24 against which the periphery of member 32 abuts.

As mentioned above, the carriage 24 is mounted on ways 28 on carriage 26 for cross-feed with respect to the work. The carriage 26 is mounted on parallel ways 66 which are formed in the horizontal surface 68 of the base 10 and which are normal to the ways 14, or to the axis of rotation of the work. The carriage 26 is thus moved along ways 66 to change or vary the center distance between the axis of the work arbor and the tool arbor. An in-feed housing 70 is also mounted for sliding movement along surface 68 and is guided by parallel ways 72 which are parallel to the ways 66. The in-feed housing is mounted to the carriage 26 so that there may be in-feed movement of the carriage 26 and housing 70 together or relative to each other to produce the crowning effect of the present invention. The details of the connection between the carriage 26 and housing 70 and their movement with respect to the base 10 are best shown in Fig. 5.

The housing 70 has a forward vertical face 74 which is adapted to bear against the rear vertical face 76 of carriage 26. Such faces are provided with a plurality of aligned openings 78 and 80 therethrough and when the shaving machine of the present invention is not used for crowning but is used for the conventional shaving operation, bolts 82' are passed through such openings to secure the carriage 26 and the housing 70 together so that there cannot be relative in-feed movement between them. Such bolts are shown in Fig. 5 in broken lines for the apertures, for purpose of illustration. When the machine is used for crowning the bolts 82' are removed so that there may be relative in-feed movement between the carriage 26 and the housing 70.

When the machine is to be used for crowning, the carriage 26 and the housing 70 are so connected together that there may be relative in-feed movement between them. Such connection includes a pair of elongated bolts 82 which are received through enlarged apertures 84 in the back wall of member 26 and which have coil springs 86 disposed between the heads of the bolts and inside face of the rear wall. Pins 87 may be passed through the bolts 82 within apertures 84 to prevent turning of the bolts. The bolts project rearwardly above the horizontal surface of base 10 and are received through the openings 88 provided in brackets 90. Such brackets 90 are bolted to the horizontal surface of the base 10. Nuts 92 are threaded over the bolts 82 and are adapted to abut against the rear face of brackets 90. With the carriage 26 and the housing 70 set on proper center distance the nuts 92 may then be pulled against the brackets 90. Carriage 26 may then be given an in-feed against the action of springs 86 which will permit limited relative movement between the carriage and base 10, and also between the carriage 26 and the housing 70.

The drive means for providing the in-feed is diagrammatically illustrated in Fig. 9 and will be described hereinafter.

The in-feed mechanism and the drive therefor includes an in-feed screw 96 having its forward end threadably received in an in-feed nut 98. The screw 96 and the nut 98 are received within open recesses provided in the carriage 26 and the housing 70; and the nut 98 is mounted in bracket 101 which is fixed to the base 10. The nut 98 may be fixed to the bracket 101 by means of a plurality of screws 102 so that the nut 98 is held in fixed position with respect to the base and against axial movement in either direction. The opposite end of the screw 96 is rotatably mounted to the housing 70 within ball bearing assemblies 104 and is fixed against axial movement with respect thereto. The means for fixing the screw against axial movement includes an annular shoulder 106 which faces shoulder 108 on an end plate 110 with the end plate 110 secured to the housing and with the ball bearing assemblies disposed within the cooperating shoulders and bearing against cooperating shoulders on the screw. A gear 112 is keyed to the screw shaft and bears against one of the bearing races. A bevel gear 114 is also keyed to the screw shaft and bears against the adjacent face of the gear 112. Lock nuts 116 are threaded onto the screw shaft and bear against the bevel gear 114. This assembly prevents axial movement of screw 96 with respect to the housing 70.

It will be evident that as the screw 96 is turned, the housing 70 is moved along its ways on the base 10, since the bracket 101 is fixed to the base. For feeding in, the housing 70 would bear against carriage 26 and move it in with it. This would be to set the work and tool arbors on proper center distance and when moving them to proper center distance the nuts 92 would be loosened. When they are on proper center distance the nuts 92 may then be tightened against brackets 90 and the housing 70 would then be fixed against any further in-feed but the carriage 26 would move toward and away from the housing 70 to vary the center distance within the limits of movement of springs 86.

The in-feed screw 96 may be hand turned for hand in-feed by means of a hand wheel 118 which is keyed to shaft 120, rotatably mounted on housing 70. The inner end of the shaft 120 has a bevel gear 122 keyed thereto which meshes with the bevel gear 114. For mechanical or automatic feed, the drive is diagrammatically illustrated in Fig. 9. Such drive includes a reversible motor 124 for driving the motor shaft 126 which drives pulley 128. The pulley 128 drives another pulley 130 through belt 132. The pulley 130 is keyed to shaft 134 which has a worm 163 also keyed thereto. The worm 163 meshes with worm gear 138 which is keyed to shaft 140 having a worm 142 keyed thereto. The worm 142 meshes with worm gear 144 which is keyed to shaft 146. The shaft 146 has clutch elements 148 and 150 mounted thereon, and the clutch element 150 is mounted for sliding movement on the shaft into and out of cooperating relationship with the clutch element 148. The clutch element 148 together with pinion 152 is mounted on shaft 146 for free rotation thereon so that when the clutch elements 148 and 150 are in driving relationship the pinion 148 is driven to drive the gear 112. Thus, when the gear 112 is turned in either direction, the screw 96 is correspondingly turned.

Referring to Fig. 10, the drive for the work spindle 16 is diagrammatically illustrated. Such drive includes a main drive motor 154, which may be reversible. The drive to the spindle 16 is through the motor driven shaft 156, sprocket 158, chain 160 and sprocket 162. The sprocket 162 is keyed to shaft 164 which has a pinion 166 keyed to the opposite end thereof. The pinion 166 drives through change gears 168, 170 and 172, shaft 174 and gears 176 and 178. The gear 178 is keyed to the drive spindle 16 for driving it.

As mentioned above, the carriage 24 is cross-fed along ways 28 with respect to carriage 26. The drive for the cross-feed includes a screw 180 having the outer end rotatably mounted in bracket 182 which is fixed to carriage 26. The screw 180 is mounted on the bracket for rotation with respect thereto but is fixed against axial displacement with respect thereto. The inner, threaded end of the screw 180 is threadably received within a nut (not shown) which is fixedly mounted against axial displacement on carriage 24. Thus, as the screw 180 is turned, the nut on the carriage 24 runs along the screw to move carriage 24 along ways 28 in a direction depending upon the direction of rotation of the cross-feed screw 180.

The cross-feed screw may be turned by a hand tool which engages a square projecting end 184 on the screw 180 or it may be power driven. Such power means is diagrammatically shown in Fig. 8 and includes a reversible motor 186 having a drive shaft 188 which drives pulley 190. The pulley 190 drives pulley 192 through belt 194. The pulley 192 is keyed to shaft 196 which has a worm 198 keyed thereto. The worm 198 meshes with a worm gear 200 which is keyed to shaft 202. The shaft 202 drives shaft 204 through change gears 206, 208, 210 and 212. The shaft 204 also has gear 214 keyed thereto which meshes with and drives gear 216 keyed to the cross-feed screw 180.

The controls for the various drive motors may be automatic and a suitable electric control panel may be provided for giving the desired automatic operation. Such control panels are well understood by those skilled in the art and it is not thought that it is necessary to a complete understanding of the present invention to describe in detail such control panel.

Figure 4:
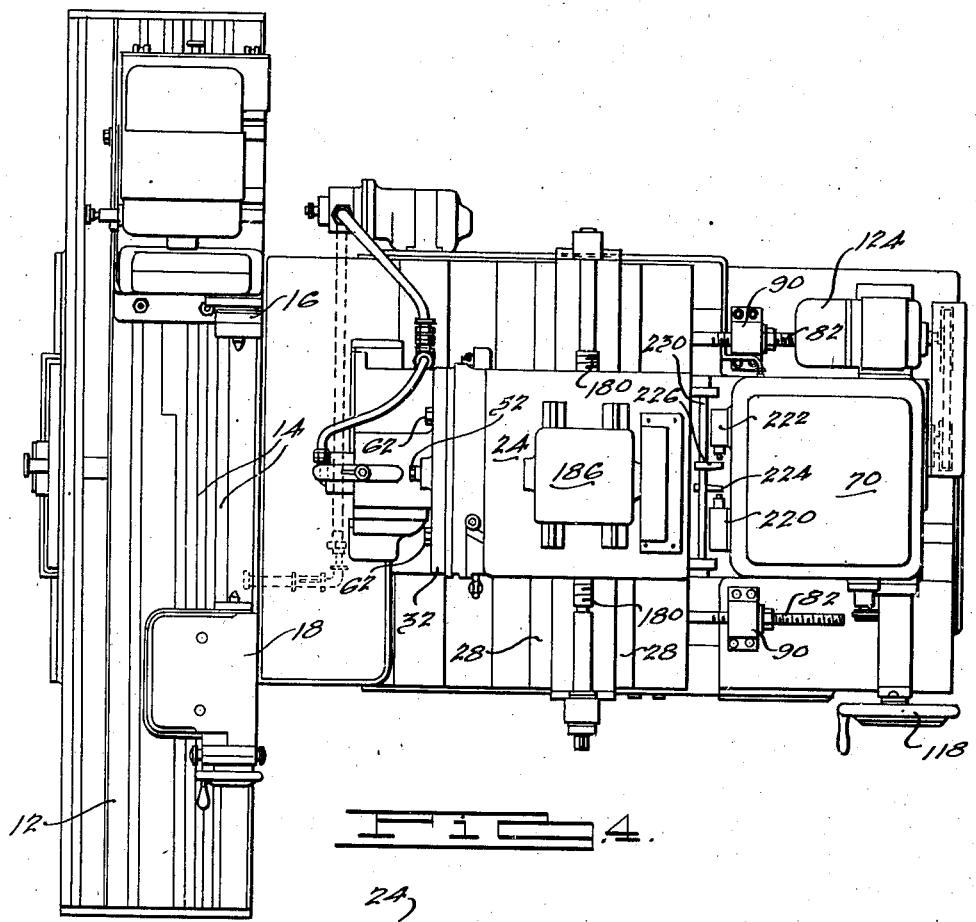
Fig. 4 is a top plan view of the machine shown in Fig. 1.

The only parts of such control which need be shown are the reversing switches for reversing the motor 186 and for thereby reversing the cross-feed. Such switches are indicated at 220 and 222 (Fig. 4) and may be mounted on the in-feed housing 70. Adjustable stops 224 and 226 may be adjustably mounted on bars 228 and 230, respectively, which are mounted to brackets on the back wall of carriage 24. Thus, as the carriage 24 moves in one direction, stop 226 actuates limit switch 222 to reverse the motor 186 and cause the carriage 24 to reverse. When the carriage reaches its limit of movement in the opposite direction, the stop 224 engages limit switch 220 to reverse the motor 226 and cause the carriage 224 to move in the opposite direction. The structure so far described may be employed for the conventional shaving of gears, that is, for the shaving of gears in accordance with the principles of the above mentioned Dalzen patents. The work gear 20 is driven by spindle 16 meshing with the circular cutter 30 which has been disposed at the proper center distance and at the proper crossed axis relationship. With this method the width of the cutter is less than the width of the gear teeth and the carriage 24 is transversely cross-fed to cover the entire width of the teeth. For this operation the carriage 26 and in-feed housing 70 are bolted together by bolts 82. The in-feed may also be automatically controlled during this shaving.

In order to obtain the crowning, the carriage 26 and housing 70 are not bolted together as mentioned above, but are connected for relative in-feed movement with respect to each other. In order to obtain the crowning effect, means are provided for varying the center distance between the work spindle and the tool spindle as the carriage 24 is cross-fed. Such means includes a cam 236 having a rounded edge 238. The cam 236 is fixedly mounted to the in-feed housing 70 at the transverse center thereof. Follower cams 240 and 242 are adjustably fixed within a T-slot 244 on the carriage 24. The cams 240 and 242 may be adjustably fixed in position in the T-slot by means of bolts 246. The cam followers 240 and 242 have cam edges 248 of predetermined contour to give the proper crowning of the gears. By varying the shape of the cam edges 248 and by varying the space between the cams 240 and 242 the crowning of the gears may be varied.

It will be appreciated that as the carriage 24 is cross-fed, the edges 248 of cams 240 and 242 bear against the edge 238 of cam 236 and will cause an in-feed of carriages 24 and 26, since such carriages may be moved relative to in-feed housing 70 against springs 86. During the movement of cross-feed within the space between the facing edges of cams 240 and 242 there is no relative in-feed movement of the tool arbor with respect to the work arbor. Corresponding portions of the gear would receive the conventional shaving treatment during this period. As either end of the tooth is approached the cams 240 and 242 engage cam 236 to cause in-feed to the extent of the shape of cam edges 248. This changes the center distance between the tool arbor and the work arbor during the periods of end travel and produces the crowning effect desired. It will be evident that this varying of the center distance as the cutter approaches each end of the gear tooth is without changing the crossed-axis relationship and there is no biasing of the bearing between the work and cutter. It will also be evident that the axis of the cutter arbor always remains in a plane parallel to a plane through the work arbor, where both of such planes are normal to the direction of in-feed. In other words, during the cross-feed, including the crowning, the angular relation between the arbors never changes. The limit stops 224 and 226 are so positioned that the cross-fed carriage is reciprocated and the ways on which it reciprocates are parallel to the work gear arbor. The cam action is responsive to the reciprocation of the cross-fed carriage between the limits of reciprocation thereof so that the tool arbor is bodily moved toward and away from the work gear arbor thereby varying the center distance between the arbors without changing the crossed-axis relationship. More specifically, the tool arbor is caused to follow the path parallel to the work arbor over the mid-portion of the travel of reciprocation and then is caused to follow an inclined path toward and away from the work gear arbor in a direction normal thereto over the end portions of the travel of the cross-feed carriage, at all times remaining in planes parallel to a plane through the work arbor where all of such planes are normal to the direction of in-feed, as mentioned above.

Formal changes may be made in the specific embodiments described without departing from the substance of the invention, the scope of which is commensurate with the appended claims.

What is claimed is:

1. A machine for shaving gears comprising a base, a work gear arbor, a rotary cutting tool arbor, means mounting said arbors in predetermined crossed-axis relationship at predetermined center distance, said last named means including first and second carriages and a housing mounted on said base, means mounting said tool arbor on said first carriage, means mounting said first carriage on said second carriage for reciprocation in a direction parallel to the gear arbor, means mounting said second carriage and said housing for movement toward and from said gear arbor to set said arbors at predetermined center distance, means mounting said second carriage for relative movement with respect to said housing, and means interposed between said first carriage and said housing responsive to the reciprocation of the first carriage between the limits of reciprocation thereof to cause said relative movement between said second carriage and said housing for bodily moving said tool arbor, first carriage and second carriage toward and away from the gear arbor in a direction normal to the direction of reciprocation without changing the crossed-axis relationship.

2. A machine for shaving gears comprising a base, a work gear arbor, a rotary cutting tool arbor, means mounting said arbors in predetermined crossed-axis relationship at predetermined center distance, said last named means including first and second carriages and a housing mounted on said base, means mounting said tool arbor on said first carriage, means mounting said first carriage on said second carriage for reciprocation in a direction parallel to the gear arbor, means mounting said second carriage and said housing for movement toward and from said gear arbor to set said arbors at predetermined center distance, means mounting said second carriage for relative movement with respect to said housing, and means interposed between said first carriage and said housing responsive to the reciprocation of the first carriage between the limits of reciprocation thereof to cause said relative movement between said second carriage and said housing for causing said tool arbor to follow a path parallel to the work gear arbor over the mid-portion of the travel of reciprocation and to follow an inclined path toward and away from the gear arbor in a direction normal thereto over the end portions of reciprocation.

3. A machine for shaving gears comprising a base, a work gear arbor, a rotary cutting tool arbor, means mounting said arbors in predetermined crossed-axis relationship at predetermined center distance, said last named means including first and second carriages and a housing mounted on said base, means mounting said tool arbor on said first carriage, means mounting said first carriage on said second carriage for reciprocation in a direction parallel to the gear arbor, means mounting said second carriage and said housing for movement toward and from said gear arbor to set said arbors at predetermined center distance, means mounting said second carriage for relative movement toward and away from said housing, means resiliently urging said second carriage toward said housing, and means interposed between said first carriage and said housing responsive to the reciprocation of the first carriage between the limits of reciprocation thereof to cause said relative movement between said second carriage and said housing for bodily moving said tool arbor, first carriage and second carriage toward and away from the gear arbor in a direction normal to the direction of reciprocation without changing the crossed-axis relationship.

4. A machine for shaving gears comprising a base, a work gear arbor, a rotary cutting tool arbor, means mounting said arbors in predetermined crossed-axis relationship at predetermined center distance, said last named means including first and second carriages and a housing mounted on said base, means mounting said tool arbor on said first carriage, means mounting said first carriage on said second carriage for reciprocation in a direction parallel to the gear arbor, means mounting said second carriage and said housing for movement toward and from said gear arbor to set said arbors at predetermined center distance, means mounting said second carriage for relative movement toward and away from said housing, means resiliently urging said second carriage toward said housing, and cam means interposed between said first carriage and said housing responsive to the reciprocation of the first carriage between the limits of reciprocation thereof to cause said relative movement between said second carriage and said housing for bodily moving said tool arbor, first carriage and second carriage toward and away from the gear arbor in a direction normal to the direction of reciprocation without changing the crossed-axis relationship.

5. A machine for shaving gears comprising a base, a work gear arbor, a rotary cutting tool arbor, means mounting said arbors in predetermined crossed-axis relationship at predetermined center distance, said last named means including first and second carriages and a housing mounted on said base, means mounting said tool arbor on said first carriage, means mounting said first carriage on said second carriage for reciprocation in a direction parallel to the gear arbor, means mounting said second carriage and said housing for movement toward and from said gear arbor to set said arbors at predetermined center distance, means mounting said second carriage for relative movement toward and away from said housing, means resiliently urging said second carriage toward said housing, and cam means interposed between said first carriage and said housing responsive to the reciprocation of the first carriage between the limits of reciprocation thereof to cause said relative movement between said second carriage and said housing for bodily moving said tool arbor, first carriage and second carriage toward and away from the gear arbor in a direction normal to the direction of reciprocation without changing the crossed-axis relationship, said cam means including a cam centrally mounted on said housing and a pair of adjustable cams mounted on said first carriage and adapted to engage said first named cam upon reciprocation of said first carriage.

CHARLES R. STAUB.